(12) United States Patent
Vesterager

(10) Patent No.: US 10,836,982 B2
(45) Date of Patent: Nov. 17, 2020

(54) HIGHLY ALKALINE DETERGENT COMPOSITION

(71) Applicant: Graff Pehrson Vesterager GmbH, Weißenborn (DE)

(72) Inventor: Niels Ole Vesterager, Elpersbüttel (DE)

(73) Assignee: Graff Pehrson Vesterager GMBH, Weibenborn (DE)

( * ) Notice: Subject to any disclaimer, the term of this patent is extended or adjusted under 35 U.S.C. 154(b) by 0 days.

(21) Appl. No.: 15/509,646

(22) PCT Filed: Sep. 9, 2015

(86) PCT No.: PCT/IB2015/001749
§ 371 (c)(1),
(2) Date: Mar. 8, 2017

(87) PCT Pub. No.: WO2016/038449
PCT Pub. Date: Mar. 17, 2016

(65) Prior Publication Data
US 2017/0298304 A1  Oct. 19, 2017

(30) Foreign Application Priority Data
Sep. 9, 2014  (EP) .................................... 14184070

(51) Int. Cl.
| | |
|---|---|
| *C11D 3/48* | (2006.01) |
| *C11D 3/04* | (2006.01) |
| *C11D 3/06* | (2006.01) |
| *C11D 3/08* | (2006.01) |
| *C11D 3/10* | (2006.01) |
| *C11D 3/20* | (2006.01) |
| *A01N 25/34* | (2006.01) |
| *A01N 59/00* | (2006.01) |
| *C11D 3/00* | (2006.01) |
| *C11D 3/22* | (2006.01) |
| *C11D 3/33* | (2006.01) |
| *C11D 3/386* | (2006.01) |
| *C11D 3/395* | (2006.01) |
| *C11D 3/50* | (2006.01) |
| *C11D 17/00* | (2006.01) |

(52) U.S. Cl.
CPC ............... *C11D 3/48* (2013.01); *A01N 25/34* (2013.01); *A01N 59/00* (2013.01); *C11D 3/0073* (2013.01); *C11D 3/0094* (2013.01); *C11D 3/044* (2013.01); *C11D 3/06* (2013.01); *C11D 3/08* (2013.01); *C11D 3/10* (2013.01); *C11D 3/2068* (2013.01); *C11D 3/2075* (2013.01); *C11D 3/2079* (2013.01); *C11D 3/222* (2013.01); *C11D 3/33* (2013.01); *C11D 3/386* (2013.01); *C11D 3/3953* (2013.01); *C11D 3/3955* (2013.01); *C11D 3/50* (2013.01); *C11D 17/006* (2013.01)

(58) Field of Classification Search
CPC ...... A01N 25/34; A01N 59/00; C11D 3/0073; C11D 3/0094; C11D 3/044; C11D 3/06; C11D 3/08; C11D 3/10; C11D 3/2068; C11D 3/2075; C11D 3/2079; C11D 3/222; C11D 3/33; C11D 3/386; C11D 3/3953; C11D 3/3955; C11D 3/50; C11D 17/006
See application file for complete search history.

(56) References Cited

U.S. PATENT DOCUMENTS

| | | | |
|---|---|---|---|
| 3,586,633 A | 6/1971 | Schlussler | |
| 3,583,923 A | 8/1971 | Cantrell, Jr. et al. | |
| 4,048,121 A | 9/1977 | Chang | |
| 4,320,026 A | 3/1982 | Cristobal et al. | |
| 4,397,776 A * | 8/1983 | Ward | C11D 1/75 510/237 |
| 5,858,941 A * | 1/1999 | Oakes | C11D 1/62 134/40 |
| 6,017,864 A | 1/2000 | Brittain et al. | |
| 6,221,832 B1 * | 4/2001 | Casteel | C11D 17/06 510/446 |

FOREIGN PATENT DOCUMENTS

| | | |
|---|---|---|
| WO | 99/38942 | 8/1999 |
| WO | 2014/013120 | 1/2014 |
| WO | 2014/065852 | 5/2014 |

OTHER PUBLICATIONS

International Search Report based on International Application No. PCT/IB2015/001749, dated Jan. 29, 2016, 5 Pages.

\* cited by examiner

*Primary Examiner* — Mina Haghighatian
*Assistant Examiner* — Nathan W Schlientz
(74) *Attorney, Agent, or Firm* — McCarter & English, LLP

(57) ABSTRACT

Present invention relates to a detergent composition and a method for preparing the composition. The composition may be a compressed tablet, a coated tablet, in form of small granules or pearls packed in a dose unit. The composition may also be formulated so as to be an effervescent composition. The detergent composition may conveniently be used in the food industry for cleaning of appliances in food processing and preparation or in the metal industry for cleaning of appliances with respect to soot or oil residues.

17 Claims, 2 Drawing Sheets

HIGHLY ALKALINE DETERGENT COMPOSITION

RELATED APPLICATIONS

This application is a national stage application under 35 USC 371 of PCT/IB2015/001749, filed Sep. 9, 2015, which claims the benefit of European Patent Application No. 14184070.2, filed Sep. 9, 2014, which is incorporated herein, in its entirety, by reference.

TECHNICAL FIELD

Present invention relates to a detergent and/or disinfectant composition and a method for preparing the composition. The composition may be a compressed tablet, a coated tablet, in form of small granules or pearls packed in a dose unit. The composition may also be formulated to be an effervescent composition. The detergent composition may conveniently be used in the food industry for cleaning of appliances in food processing and preparation or in the metal industry for cleaning of appliances with respect to soot or oil residues. The detergent composition is typically suitable for use in food industry including aqua cultures.

BACKGROUND

In the food industry, it is paramount that before and after processing of food products, the appliances used for the processing of foods is sanitary clean so as not to convey microbes or spores into the processed food product. Consequently, it is important that the appliances used can be properly cleaned to allow for a clean and sanitary processing of food products. The composition according to the invention may also be used in commercial kitchens such as e.g. in restaurant kitchens or kitchens in hotel or military facilities etc.

Moreover, in e.g. the metal industry such as e.g. industry that produces metals or refines metals into metal products or pieces, there is a need to clean any equipment used in the process from for example oils used during drilling in metal pieces or soot or tarry residues or deposits on the equipment used.

WO 2014/013120 relates to a detergent composition in the form of an effervescent tablet for cleaning of surfaces. However, the compositions described therein will not be able to successfully clean or disinfect appliances or equipment used in the food industry. Moreover, the compositions according to the document will not be able to clean surfaces having oil residues or contaminated with soot.

U.S. Pat. No. 3,586,633 relates to an alkaline cleansing agent which prevents hydrolysis and deposit of calcium compounds due to the use of hard water. The composition contains foaming non-ionic tensides and phosphonates. The product is a powder designed to be used in rinsing or washing machines. The amount of tensides used is very low (about 1% w/w).

WO 99/38942 relates to a low foaming surfactant composition useful in highly alkaline caustic cleaners. The composition is in the form of a liquid and contains low-foaming non-ionic tensides in very low amounts (0.30-0.55% w/w). The purpose of the non-ionic surfactant is to reduce the surface tension and not to dissolve dirt. In the examples, 1.7% of Pluronic N3 is used.

WO 2014/065852 relates to a detergent composition comprising alkali metal hydroxyde and method of modifying a surface. The composition contains a polycarboxylic acid copolymer which inhibits formation of Ca-spots due to the use of hard water. The composition is used in washing machines.

However, there is still a need for developing cleaning or disinfectant compositions for use in cleaning of other appliances than washing machines. None of the compositions mentioned in the documents mentioned above are suitable for use in larger appliances such as in cleaning of motors, food apparatuses, engines, surfaces etc. in industries like eg shipping or food industries. The cleaning effect is not sufficient.

DESCRIPTION OF THE INVENTION

Figure 1:
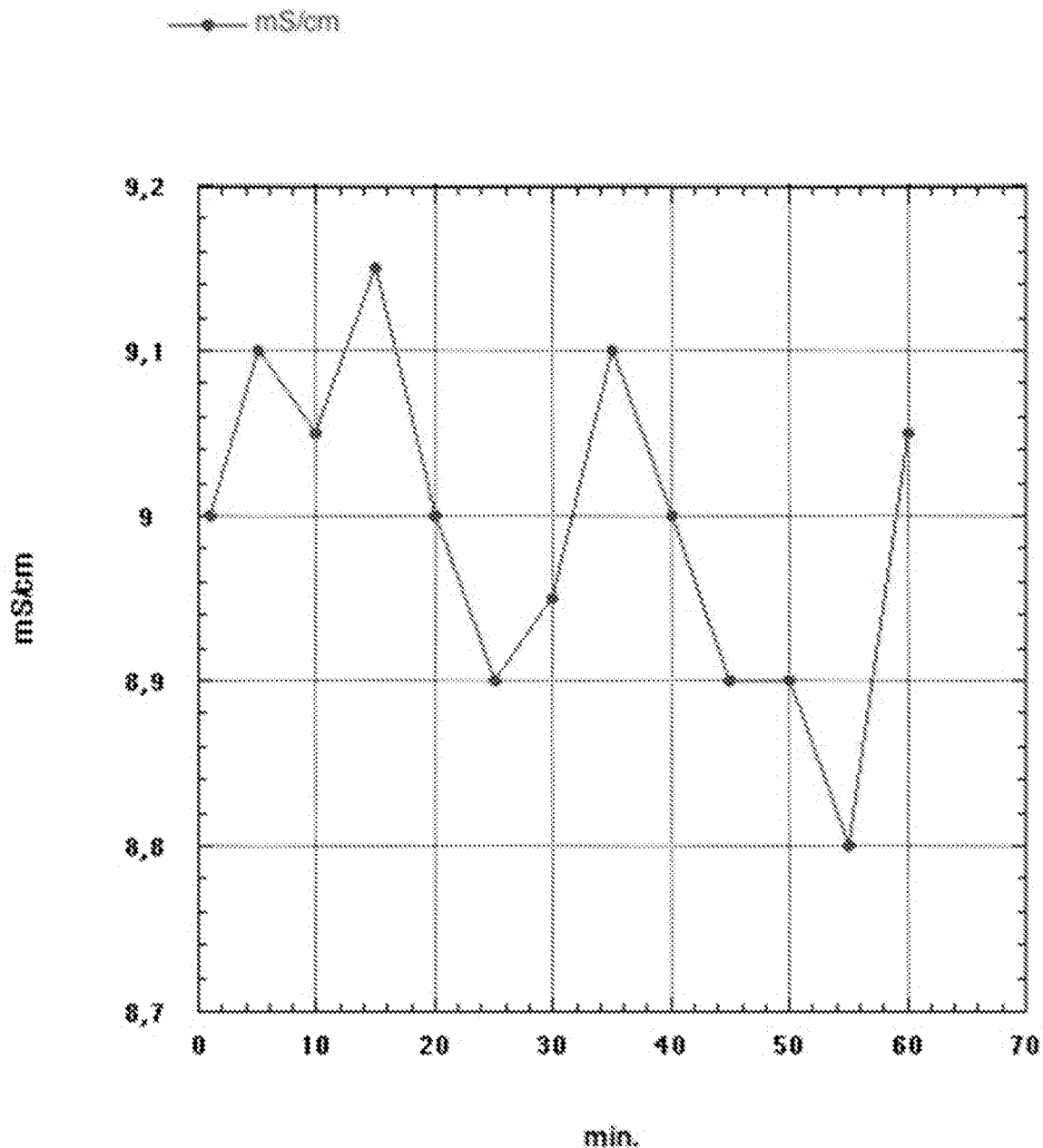
FIG. 1 shows variation in conductivity measured during 60 min.

Present invention relates to a detergent composition that may be capable of acting both as a cleaning agent and as a disinfectant agent for any surface. The detergent composition may be used in the food industry for cleaning of any appliances or equipment for processing of food products.

A composition of the invention typically contains from about 40 to about 95% w/w alkaline constituents and from about 5 to about 25% w/w of tensides. The combination of alkaline constituents and tensides are important in order to achieve the desired cleaning effects.

The teachings in the above-mentioned documents cannot be used for the purpose described herein as the concentration of tensides is too low. In order to achieve the desired effect, the cleaning effect must be a combination of the alkaline constituents and the tensides. The concentration of tensides is normally very low as many tensides have a foaming effect and in washing machines, this must be avoided as foam has a detrimental effect on the machines. In the present invention, the concentration of tensides is important in order to reduce the surface tension to a degree, where the alkaline constituents can penetrate the dirt, dissolve it, and keep it in dissolution so that the dirt does not deposit on an already cleaned surface.

The block polymer used in some of the above-mentioned documents does not possess such properties. The block polymer is capable of having water running down a surface without spots (veil) and is generally foam-inhibiting in order to ensure a proper function of a washing machine.

Present invention also relates to a detergent composition that may be used for cleaning any surface of oil, soot or tarry residues. The detergent composition may be used in the industry for cleaning of any appliances. This may include e.g. removal of various oils, fats, soot, or any deposits on e.g. engine cylinders. It may also be used for removal of particles or flakes or colour from e.g metal surfaces, walls, floors. The detergent can be used for cleaning of any types of machines such as e.g. engines with motor strengths of about 500 horse power up to about 150000 horse power. The composition according to the invention may also be used for cleaning any parts of a machine, such as e.g. motor blocks, cylinders, gearwheel or cogwheel or piston.

Both a detergent (cleaning) composition and a disinfectant composition contain the high level of tensides and the alkaline constituents.

A composition of the invention comprises:
45-95% w/w of alkaline constituents,
5-25% w/w of tensides, and
optionally other substances like eg complex binder/dispersion agents, tableting excipients, organic acids, thickener etc.
with the proviso that the sum of ingredients amount to 100% w/w.

The alkaline constituents are selected from alkali metal hydroxides, alkali metal silicates, alkali metal carbonates, alkali metal percarbonates, alkali metal phosphates and alkali metal glyconates, and mixtures thereof. The alkali metal may be sodium, potassium, lithium; sodium salts are preferred. The total concentration is from 45 to 95% w/w, preferably from 45% to 92% w/w.

When an alkali metal hydroxide is present, it is normally present in a concentration of from 5 to 60% w/w, notably from 5 to 55% w/w.

When an alkali metal silicate is present, it is normally present in a concentration of from 5 to 60% w/w, notably from 8 to 55% w/w.

When an alkali metal carbonate or alkali metal percarbonate is present, it is normally present in a concentration of from 5 to 45% w/w.

When an alkali metal phosphate is present, it is normally present in a concentration of from 10-20% w/w.

When an alkali glyconate is present, it is normally present in a concentration of from 5-20% w/w.

As shown in the examples herein, combinations of
i) alkali metal hydroxide, alkali metal silicate, alkali metal glyconate, and alkali metal phosphate,
ii) alkali metal hydroxide, alkali metal silicate, and alkali metal carbonates,
iii) alkali metal percarbonate and alkali metal hydroxide,
iv) alkali metal hydroxide, alkali metal carbonate, and alkali metal phosphate, and
v) alkali metal silicate
are of particular interest.

The tensides may be non-ionic tensides or ionic tensides (eg anionic or cationic tensides), or mixtures thereof. The total concentration of tensides is from 5 to 25% w/w such as from 10 to 25% w/w or from 15 to 25% w/w. A composition may contain only one type of tenside (eg non-ionic, anionic, cationic or amphoteric), or it may contain a combination of two, three or four types of tensides. A composition of the invention may also contain one or more tensides belonging to the same or different type of tensides.

Normally, the tensides are used in the following concentration ranges provided that the sum is within the range of from 5 to 25% w/w

| | |
|---|---|
| Nonionic tensides/surfactants (low & high EO): | 1.0-10% w/w |
| Ionic tensides/surfactants: | 2-15% w/w |
| Amphoteric tensides/surfactants: | 1.5-10% w/w |

More specifically, a detergent composition may comprise
45-95% w/w of alkaline constituents,
5-25% w/w of tensides,
wherein the alkaline constituents are

| | |
|---|---|
| Alkali metal hydroxide | 40-90% w/w, and/or |
| Silicate such as e.g. $SiO_2$, $Na_2SiO_3$, $K_2SiO_3$ | 0.5-30% w/w, and/or |
| Carbonates/hydrogen carbonates | 2-15% w/w, or | mixtures thereof provided that the total concentration of alkaline constituents are from 45 to 95% w/w.

In those cases, where the composition is also a disinfectant composition, the composition may further comprise a disinfectant compound such as sodium dichloroisocyanurate or another chlorine agent and/or a combination of active oxygen agent such as alkali metal percarbonate with an activator for the active oxygen agent such as TAED (tetraacetylenediamine).

pH of a composition of the invention is typically from about 10 to about 13.5.

A composition of the invention may also comprise one or more inhibitors (cover the metal surface to avoid any undesired interaction with the composition and the surface), one or more complex binders or dispersion agents. If present, the concentration of the inhibitors is from 2 to 20% w/w notably from 3-10% w/w. In the examples herein, a concentration of 5% w/w is employed. If a complex binder or dispersion agent is present, the concentration is typically from about 2 to about 15% w/w. Further, specific types are given in the following; all the below mentioned substances (individually or in any combination) may or may not be present, but if present the concentration range (% w/w) is given below:

| | |
|---|---|
| Complex binder or dispersion agent: | 0-15, if present 2.0-15 |
| Organic complexator: | 0-20, if present 1.5-20 |
| Inhibitor: | 0-20, if present 2.0-20 |
| Carbonates/hydrogen carbonates: | 0-15, if present 2.0-15 |
| Tableting agents/excipients: | 0-3, if present 0.5-3.0 |
| Active chlorine agent: | 0-40, if present 15-40 |
| Active oxygen agent: | 0-30, if present 5-30 |
| Activator for active oxygen agent: | 0-45, if present 7-45 |
| Organic solvents: | 0-15, if present 3-15 |
| Enzymes: | 0-5, if present 0.1-5.0 |
| Organic acids: | 0-30, if present 5-30 |
| Fragrance component: | 0-3 |
| Thickener: | 0-20 |

The detergent composition according to the invention may e.g. comprise the following (stated in % of total weight of one dosage unit):

| | |
|---|---|
| Alkalimetal hydroxide: | 45-90% |
| Silicate such as e.g. $SiO_2$, $Na_2SiO_3$, $K_2SiO_3$ | 0.5-30 |
| Complex binder or dispersion agent: | 2.0-15 |
| Organic complexator: | 1.5-20 |
| Inhibitor: | 2.0-20 |
| Carbonates/hydrogen carbonates: | 2.0-15 |
| Tableting agents/excipients: | 0.5-3.0 |
| Nonionic tensides/surfactants (low & high EO): | 1.0-10 |
| Active chlorine agent: | 15-40 |
| Active oxygen agent: | 5-30 |
| Activator for active oxygen agent: | 7-45 |
| Anionic tensides/surfactants: | 2-15 |
| Organic solvents: | 3-15 |
| Enzymes: | 0.1-5.0 |
| Organic acids: | 5-30 |
| Fragrance component: | 0-3 |
| Thickener: | 0-20 |

The invention thus provides for a highly alkaline detergent composition such that the pH of the washing solution comprising the detergent composition of present invention is in range of about 9.5 to about 13.9

The composition according to the invention may also be an effective disinfectant according to DIN/EN 1276, DIN/EN 1650 and DIN/EN 13697 standard, while at the same time being less harmful to microorganism naturally occurring in e.g. lakes or water streams such as e.g. daphnia.

Moreover, the composition according to the invention is very thermally stable in a room temperature interval of from about −80° C. to about +70° C. The composition according to the invention is stable for several months such as e.g. for several years in said temperature interval.

The composition according to the invention may be in form of a tablet of any kind. This may e.g. be a compressed tablet, an effervescent tablet etc. The tablet may comprise one or more compartments or parts integrated into one dosage unit. Thus, the tablet may comprise one or more layers or parts wherein the layers or parts may comprise one or more of the components or agents of the composition according to the invention. The tablet may also be coated with a dissolvable coating such as starch like coating that dissolves in water or the aqueous washing liquid.

The composition according to the invention may also be formulated in a sachet or bag that may be a dissolvable sachet or bag or wherein the sachet or bag has to be opened prior to use of the composition.

The composition may also be in form of micro tablets such as e.g. granules or pearls. The granules or pearls may be used as such to be measured up in a scoop or may be filled in capsules or sachets or bags as mentioned above. The granules may also be used as the starting material when compressing tablets, such that the tablets are compressed granules or pearls.

The tablet composition according to the invention may have any suitable dimensions for the purpose of its use. Most suitably, the tablet may have a dimension of a circular tablet that may have a diameter of from about 35 mm to about 80 mm and may have a weight of about 30 g to about 300 g, such as e.g. about 30 g to about 125 g, about 30 g to about 100 g such as e.g. about 30 g to about 75 g. However, the tablet may have any shape such as e.g. a rectangular shape or spherical or egg-like shape or the shape of a capsule. The tablet may be scored to allow the tablet to be broken into two or more equal pieces depending on the purpose of its use. The height of the tablet is typically from about 10 to about 50 mm such as from about 20 to about 30 mm.

The density of the tablet composition may be in the range of from about 1.20 g/cm$^3$ to about 2.05 g/cm$^3$, such as e.g. about 1.20 g/cm$^3$ to about 1.90 g/cm$^3$, such as e.g. about 1.20 g/cm$^3$ to about 1.7 g/cm$^3$, such as e.g. about 1.20 g/cm$^3$ to about 1.50 g/cm$^3$, such as e.g. about The compression force of the tablet may be in range of about 80 to about 350 kN.

The tablet composition according to the invention is easily and quickly dissolvable in water or aqueous solutions. It is important to note that when coming in contact with water, the tablet does not collapse into forming a cake, i.e. that the composition collapses into a clay like cake which is less easily dissolvable. This is due to the process of preparing the tablets The tablet is easily dissolvable in water as mentioned above. At a water temperature of 60° C. a 75 g tablet is dissolved within 6 minutes or less. However, the rate of dissolution can be modified by the hardness/density of the tablet.

The tablet according to the invention provides a pH of the washing fluid in which it dissolves to about 10 or more such as about 11 or more, about 12 or more, such as e.g. 13 or more, such as e.g. 13.5 or more such as e.g. 13.9. This can conveniently be measured when a 75 g tablet of the detergent composition according to the invention is dissolved in 10 l of neutral water (pH of 6.0) and thereafter measure the pH in the water.

A further advantage of the composition of the invention is stable foaming composition. This specifically means that the foam generated by the detergent composition will adhere to any surfaces it is applied on and will stay on the surface of an object for 30 minutes or more, such as 45 minutes or more, such as e.g. 60 minutes or more, such as e.g. about 90 minutes or more. This will provide for a more effective cleaning of the object to be cleaned. The stable foam can be formulated and designed by means of addition of a thickening agent to the detergent composition.

The composition according to the invention is characterized by its content of alkali metal constituents as mentioned above. The amount of alkali metal hydroxide is normally from 5 to 60% w/w, notably from 5 to 55% w/w, but higher concentrations may be suitable for use if alkali metal hydroxide is the primary or sole alkali metal constituent. Thus, concentration of at least about 45% w/w, such as at least about 50% w/w, such as at least about 55% w/w, such as at least about 60% w/w, such as at least about 65% w/w, such as at least about 70% w/w, such as at least about 75% w/w, such as at least about 80% w/w, such as at least about 85% w/w, such as at least about 90% w/w, such as at least about 95% w/w based on the weight of the total weight of the composition, are contemplated. Suitable alkali metal hydroxides may be e.g. LiOH, NaOH or KOH. However, other alkali components may be used such as e.g. $Na_2CO_3$, $NaHCO_3$, $Na_2SiO_3$, $Na_5P_3O_{10}$, $K_4P_2O_7$ etc. as mentioned herein before.

The composition may further comprise a complex binding agent and/or a dispersion agent. Such agents may be chosen from e.g. alkali salts of organic acids such as e.g. tri-sodium citrate anhydrate, tri-sodium citrate dehydrate, salts of polycarboxylates, salts of methylglycine diacetic acid, homo or co-polymers based on acrylic acid, glutamic acid-N,N-diaceticacid tetrasodium salt, D,L-asparatic acid N-(1,2-dicarboxyethyl)tetrasodium salt, iminodisuccinate tetrasodium salt, mono-, di- and tricarboxylic acid sodium salts, sodium salts of polyphoshoric acid, nitrilotriacetic acid, ethylenediaminetetraacetic acid, diethylenetriaminepentaacetic acid, hydroxyethylenediaminetriacetic acid, phosphonates such e.g. as 1-Hydroxyethylidene-1,1-diphosphonic acid (HEDP), Amino tris(methylenephosphonic acid (ATMP), Ethylenediamine tetra(methylene phosphonic acid) (EDTMP) and Phosphonobutane-tricarboxylic acid (PBTC). The agents may also be chosen from carboxylated copolymers or homopolymers of acrylic acid.

Further examples of complex binders and/or dispersion agents are e.g maleic acid/acrylic acid copolymer, Na-salts of polycarboxylates, polyacrylic acid sodium salt, sodium salt of maleic acid/olefin copolymer, polyaminoacids such as e.g. polyglutamic acid, polyaspartic acid.

In order to have an effervescent detergent and anti-caking effect, at least one anti-caking agent such as Mg-silicates, Al-silicates, Na-aluminosilicates is present in the composition. As effervescent, an organic acid is suitably used in combination with the other basic components of the compositions. Any organic acid may be used for the purpose and preferably anhydrous citric acid, anhydrous adipic acid, anhydrous malonic acid, anhydrous maleic acid, poly-carboxylic acid, gluconic acid, cholic acid, or $SiO_2$.

The composition according to the invention may also comprise an emulsifying agent. The emulsifying agent may be e.g. low ethoxylated fatty alcohols. Such alcohols are formed by reacting an alcohol with ethylene oxide according to the scheme below

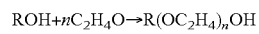

The degree of ethoxylation is the number of ethylene oxide units that are consumed in the reaction (n) and is abbreviated as EO. In present invention low ethoxylated fatty alcohols have an EO<7 such as less than 6 or less than 5 or less than 4 or less than 3. Examples of such ethoxylated fatty alcohols are e.g. saturated iso C13 alcohols such as e.g. Lutensol TO 3, TO 5, TO 6. The requirement of EO<7 is that above this degree of ethoxylation, the fatty alcohols become water soluble which in this context is an undesirable property. Further examples are C13-C15 alcohols, Lutensol AO 3, AO 4, AO 5, AO 7. Other examples are oleic acid ethoxylate (Emulan A), fatty alcohol ethoxylate (Emulan P), alkylphenol ethoxylate (Emulan PO).

The composition according to the invention also preferably comprises tensides. It should be noted that throughout the description of present invention the term "tenside" is interchangeably used and equivalent to the term "surfactant". Tensides used for the purpose of detergent agents are commonly divided into non-ionic or anionic tensides.

Among the non-ionic tensides that may be used in the composition according to the invention, high etoxylated fatty alcohols having an EO>8 or an EO in range of about 8 to about 50, polyethylene glycol 400-8000, polyethylene-polypropylene or alkylpoly glycosides wherein the alkyl group is selected from e.g. butyl-, hexyl-, 2-ethylhexyl-, C8-C10-, decyl-, undecyl-, coco- and lauryl-may suitable used. Other suitable example are e.g. saturated iso C13 alcohols such as e.g. LutensolTO 8-TO 20, C13-C15 alcohols: Lutensol AO 8-AO 30, C12-C18 alkylpolyethyleneglycol-polypropyleglycolether, C12-C18 alkylpolyethyleneglycol-butyleneglycolether, C16-C18 alkylpolyethyleneglycolether. A further example is aminoxide.

Among the ionic tensides, sodium salts of alkyl sulphates, sodium salts of alkylether sulphates or betaines of any kind may be suitable used. Amphoteric tensides are eg Tensan VS. Heloxyl ADAX, Tego betain F.

Present invention also includes compositions, which may comprise an organic solvent. The solvents should be able to dissolve fatty residues such as e.g. fats from food products or oils used or produced in the metal production industry. Such solvents may be e.g. methyl diglycol, butyl diglycol, dihexylene glycol, dipropylene glycol monomethyl ether, n-hexylglycol, monophenylglycol, butylglycolacetat or paraffins such as n-paraffin.

Present invention also relates to a composition comprising inhibitors. The purpose of the inhibitors is to prevent corrosion of the machine or equipment to be cleaned by the composition according to present invention. Examples of suitable agents that can act as inhibitors are e.g. compounds that contain one or more nitrogen atoms, amino acids, various heterocyclic compounds such as e.g. tolyltriazole or bezontriazole, Other examples of inhibitors may be phosphonates such as e.g. sodium salt(s) of hydroxyethane di-phosphonic acid or e.g. silicates, carbonates, borates and hydroxides of $Al^{3+}$, $Ca^{2+}$, $Mg^{2+}$, $Zn^{2+}$, Na-aluminosilicates, or sodium oleoylsarcosinic acid.

The composition of present invention may also comprise an agent comprising so called active chlorine. The purpose of these agents is to act as bleaching agents. Suitable examples of bleaching agents may be e.g. anhydrous sodium dichlorocyanurate, anhydrous trichlorocyanurate, and various types of chloramines such as e.g. chloramine-T and calcium or sodium hypochlorite etc.

The composition of present invention may also comprise a compound containing so-called active oxygen. Such compounds may e.g. be sodium percarbonate, sodium perborate or potassium monopersulphate. Other examples of compounds carrying active oxygen are e.g. Tinolux BBS, peroxides of Na, Ca and Ba, or ureaperoxide.

The composition of present invention may also comprise activator for the active oxygen compounds. Such compounds are e.g. tetraacetyl ethylenediamine, 1,5-diacetyl-2, 2-dioxohexahydro-1,3,5-triazine or pentaacetylglucose.

The composition according to the invention may furthermore comprise a thickener. A thickener may be e.g. a polysaccharides such as e.g. starches, vegetable gums, or pectin. The agent may also be a polyvinylalcohol or a polymeric compound such as e.g. acrylic polymers, crosslinked and non-cross-linked polyacrylates. Other suitable examples are e.g. 4-methyl-1,3-dioxolan-2-one) from and/or dibenzylidene sorbitol.

The composition according to the invention may also comprise an enzyme for degrading any compounds present on the surface to be cleaned. Suitable enzyme may be e.g. an amylase or esparase, protease, lipase and cellulase.

In case the composition according to the invention is formulated into a tablet, various compounds excipient compounds may be used in aiding the tableting preparation. Such compounds may be e.g. magnesium stearate, magnesium stearyl fumarate, sodium sulphate (anhydrous), magnesium sulphate (anhydrous), sodium carbonate (anhydrous), magnesium carbonate (anhydrous) etc. These compounds may be used as drying agents to keep any water in the composition bound as crystal water to the drying agent in seta dog being absorbed by the alkalimetal hydroxide.

The composition according to the invention may be used as a detergent in cleaning various items as specified herein. Consequently, present invention relates to use of the composition according to the invention as detergent.

Preferably, the composition according to the invention is used as a detergent in the food industry for cleaning any food areas and processing apparatus. The composition according to the invention may be used as a disinfectant in e.g. the food industry.

Preferably, the composition according to the invention is used as a detergent in the metal production industry for cleaning apparatuses or machines or any parts of machines. This includes removal of oil residues, soot residues or any tarry residues that may be deposited on any surface of the machine etc.

Present invention also relates to a process for preparing the composition according to the invention.

In the process of preparing a composition according to the invention, it is essential that all components used in preparing the composition are water free or substantially water free. Typically, the content of water in the components making up the composition is around about 0.1% to about 3.5%. Typically, the tensides used may contain traces of water. Consequently, the compositions and methods of preparing the compositions sue drying agent such as e.g. alkalimetal carbonates, alkalimetal hydrogencarbonates, alkalimetal sulphates of phosphonates are used to draw any aqueous content of the components into the drying agent.

During the process of preparing the composition according to the invention, a suitable drying agent in form of a powder is selected. The power is then applied to the semi fluid mass of the components making up the composition. The process is then paused so as to allow any water to be absorbed by the drying agents and be bound as crystal water. Typically this period is from about 5 minutes to about 35 min, such as e.g. about 10 min, such as e.g. about 20 min.

Drying agents may be used in from of finely divided particles or in from of a powder. Such drying agents or absorption agents may be e.g. sodium-, og magnesium carbonate, sodium- and/or magnesium sulphate. Powders or granulates of phosphates may be used such as e.g. sodium- og potassium tripolyphosphate, pyrophosphates and the likes.

About 1 part of drying agent can be used to about 0.5 part of semi fluid mass, or about 1 part of drying agent can be used to about 1 part of semi fluid mass After the drying and absorption phase, further components may be added. Most notably is that the organic acid, if present, is added after the drying phase of the preparation method. Any traces of free, non-crystal bound water will result in an undesirable reaction between the bases (alkali metal hydroxides or carbonates etc.) and the acids used in the composition.

In the method of preparing a composition according to the invention, there may be water present in the tensides, and in the emulsifiers, inhibitors or organic solvents, if present. Under the proviso that said components are fluid, one or more of the tensides, and emulsifiers, inhibitors or organic solvents, if present, are sprayed onto the drying agent/absorption agents. The drying agents/absorption agents, which may be one of the alkaline metal constituents, should preferably be in a finely divided particulate from such as e.g. granules or powder form. After being sprayed onto the drying agent/absorption agent, the mixture should be allowed to rest to allow for all water or substantially all water to be absorbed and bound by the drying agents/absorption agents. The rest period will also allow the components sprayed onto the drying agents/absorption agents to penetrate into the drying agents or adhere to the surface of the drying agents. The drying agents/absorption agents as mentioned herein may be a mix of one or more drying agents such as e.g. sodium carbonate and/or sodium potassium phosphates, i.e. in this case one or more of the alkaline metal constituent, After a rest period of about 20 min, the mixture is briefly mixed in a blender or mixer for about 30 seconds after which the mixture is allowed to rest again. The procedure may then be repeated with 30 minutes intervals between mixing and resting periods. The process is continued until the composition has the desired flowability. The advantage with this process is the powder composition in form of ultrafine powder acquires the same characteristics as a granulate. Depending on the material spayed onto the drying agent/absorption agent it may be an advantage to allow the sprayed on mixture rest for several days such as up to two days after which it is mixed for 60 seconds. The short mixing time will ensure that the resulting mixture is not contaminated with e.g. water from the atmosphere.

Once the resulting powder comprising tensides, emulsifiers, inhibitors or organic solvents and drying agents/absorption agents has the desired flowability, the remaining components, if any, are added and mixed into the composition. The alkali hydroxide ingredient is always added as the last ingredient. The finished granulate composition may rest for a longer period without being contaminated or degraded prior to any further processing.

If the composition is to comprise solvents and/or emulsifiers, these components are first mixed together prior to being sprayed onto the drying agent/absorption agents as described herein and may be e.g. finely divided particles or ultrafine powders of sodium carbonate or a mixture of sodium carbonate and sodium-/potassium phosphates. As mentioned above, the ratio between solvents and/or emulsifiers to drying agent/absorption agents may be about 1:2 or 1:1. Preferably, the resulting mix is allowed to rest for 1 to two days before being used in any further process In such a case the ingredients in the composition are not in fluid form, the components are mixed in the same order as described above. The resting period for the resulting mixture is typically about 30 minutes and may thereafter immediately be processed into e.g. tablets or granulates.

PRE-FORMULATION EXAMPLES

Pre-Formulation Example 1

A highly alkaline tablet suitable for use in the food industry. The tablet does not collapse into a cake when it is immersed in warm water of 35° C. or more. The tablet is completely dissolved at 60° C. within <5 min. At 80° C. it is completely dissolve within <1 min. pH value of the solution is ca. 13.8. The tablet has a diameter of about 50 mm, and a height of about 25-28 mm. The weight of the tablet is about 95-100 gram.

The tablet contains:

| 1 | Sodium tripolyphosphate | 5.00-20.00% |
|---|---|---|
| 2 | Amino tris(methylenephosphonic) acid | 1.00-10.00% |
| 3 | Hydrophile pyrogene silica acid 200 | 0.10-5.00% |
| 4 | Sodium carbonate | 2.00-10.0% |
| 5 | Magnesium sterate | 0.50-2.00% |
| 6 | methylglycine diacetic acid | 5.00-15.00% |
| 7 | polyethylene glycol 6000 | 1.00-5.00% |
| 8 | tolyltriazole | 1.00-5.00% |
| 9 | Sodium hydroxide | 60.00-90.00% |

The tablet further contains from 5-25% tensides.

Pre-Formulation Example 2

A highly alkaline tablet suitable for use in the food industry or gastronomic industry such as e.g restaurant. The tablet does not collapse into a cake when it is immersed in warm water of 35° C. or more. The Tablet is completely dissolved at 60° C. within <5 min. pH value of the solution is ca. 13.1. The tablet has a diameter of about 50 mm, and a height of about 25. The weight of the tablet is about 71-75 grams.

The tablet contains:

| 1 | Sodium tripolyphosphate | 10.00-25.00% |
|---|---|---|
| 2 | Sodium carbonat | 5.00-15.00% |
| 3 | Sodium dichlorisocyanurat | 20.00-35.00% |
| 4 | Amino tris(methylenephosphonic) acid | 1.00-5.00% |
| 5 | Hydrophile pyrogene silica acid 200 | 0.10-2.00% |
| 6 | Benzotriazole | 1.0-5.00% |
| 7 | Magnesium sterate | 1.00-2.00% |
| 8 | Sodium hydroxide | 45.00-60.00% |
| 9 | Tensides | 5-25% |

The composition fulfils the requirements of a disinfectant according to standards DIN/EN 1276, DIN/EN 1650 and DIN/EN 13697.

Pre-Formulation Example 3

A highly alkaline tablet suitable for use in the food industry or gastronomic industry such as e.g. restaurant as a disinfectant. The tablet does not collapse into a cake when it is immersed in warm water of 35° C. or more. The Tablet is completely dissolved at 60° C. within <5 min. pH value of the solution is ca. 12.8. The tablet has a diameter of about 50 mm, and a height of about 25. The weight of the tablet is about 71-75 grams.

The tablet contains:

| | | |
|---|---|---|
| 1 | Sodium tripolyphosphate | 10-25% |
| 2 | Sodium carbonate | 5-15% |
| 3 | Amino tris(methylenephosphonic) acid | 2-10% |
| 4 | Sodium percarbonate | 10-25% |
| 5 | tetraacetyl ethylenediamine | 10-25% |
| 6 | Hydrophile pyrogene silica acid 200 | 0.10-2.00% |
| 7 | Benzotriazole | 1.00-5.00% |
| 8 | Magnesium sterate | 1.00-2.00% |
| 9 | Sodium hydroxide | 45.00-60.00% |
| 10 | Tensides | 5-25% |

The composition fulfils the requirements of a disinfectant according to standards DIN/EN 1276, DIN/EN 1650 and DIN/EN 13697.

Pre-Formulation Example 4

A highly alkaline tablet suitable for use in the food industry wherein the composition highly foaming capacity and is effervescent. The tablet does not collapse into a cake when it is immersed in warm water of 35° C. or more. The Tablet is completely dissolved at 60° C. within <5 min. pH value of the solution is ca. 12.7. The tablet has a diameter of about 50 mm, and a height of about 25. The weight of the tablet is about 71-75 grams.
The tablet contains:

| | | |
|---|---|---|
| 1 | Citric acid, anhydrous | 15-30% |
| 2 | Sodium carbonate | 25-40% |
| 3 | Magnesium sterate | 0.50-2.00% |
| 4 | D,L-aspartic acid, N-(1,2-dicarboxyethyl)-tetrasodium salt | 1.00-10.00% |
| 5 | Cocobetaine | 2.00-10.00% |
| 6 | Cholic acid | 1.00-10.00% |
| 7 | Sodium Lauryl Sulfoacetate | 2.00-10.00% |
| 8 | Sodium hydroxide | 45-65% |
| 9 | Tensides | 5-25% |

Pre-Formulation Example 5

A highly alkaline tablet suitable for use in the metal processing industry, wherein the composition is highly viscous to allow a prolonged contact period. The tablet does not collapse into a cake when it is immersed in warm water of 35° C. or more. The Tablet is completely dissolved at 60° C. within <5 min, pH value of the solution is ca. 13.3. The tablet has a diameter of about 80 mm, and a height of about 25. The weight of the tablet is about 125 –130 grams.
The tablet contains:

| | | |
|---|---|---|
| 1 | Sodium tripolyphosphate | 10-20% |
| 2 | Xanthan Gum | 10-20% |
| 3 | Iminosuccinate tetrasodium salt | 5-15% |
| 4 | Hydrophile pyrogene silica acid 200 | 0.10-2.00% |
| 5 | Sodium carbonate | 3.00-15.00% |
| 6 | Magnesium sterate | 0.10-2.00% |
| 7 | polyethylene glycol 6000 | 1.00-5.00% |
| 8 | tolyltriazole | 5.00-10.00% |
| 9 | Sodium hydroxide | 50-70% |
| 10 | Tensides | 5-25% |

Pre-Formulation Example 6

A highly alkaline tablet suitable for use in the metal processing industry, where the composition has an enhanced corrosion inhibiting effect. The tablet does not collapse into a cake when it is immersed in warm water of 35° C. or more. The tablet is completely dissolved at 60° C. within <5 min. pH value of the solution is ca. 12.8. The tablet has a diameter of about 50 mm, and a height of about 25. The weight of the tablet is about 71-about 75 grams.
The tablet contains:

| | | |
|---|---|---|
| 1 | Sodium tripolyphosphate | 10-25% |
| 2 | Amino tris(methylenephosphonic) acid | 2.00-10% |
| 3 | Phosphor acid polyester | 10-20% |
| 4 | Hydrophile pyrogene silica acid 200 | 0.10-5.00% |
| 5 | Sodium carbonate | 3.00-10% |
| 6 | Magnesium sterate | 0.10-2.00% |
| 7 | Iminosuccinate tetrasodium salt | 5.00-10.00% |
| 8 | polyethylene glycol 6000 | 1.00-5.00% |
| 9 | tolyltriazole | 6.00-10.00% |
| 10 | Sodium hydroxide | 50-70% |
| 11 | Tensides | 5-25% |

Example 7

A highly alkaline tablet suitable for use in dish washing machines. The tablet does not collapse into a cake when it is immersed in warm water of 35° C. or more. The Tablet is completely dissolved at 60° C. within <5 min and at 80° C. is dissolved within <1 min. pH value of the solution is ca. 13.1. The tablet has a diameter of about 50 mm, and a height of about 25-28 mm. The weight of the tablet is about 75-90 grams.
The tablet contains:

| | | |
|---|---|---|
| 1 | Sodium tripolyphosphate | 10-25% |
| 2 | Sodium carbonate | 5-15% |
| 3 | Amylase | 0.10-1.00% |
| 4 | Esparase | 0.10-2.00% |
| 5 | Sodium dichlorisocyanurate | 20-35% |
| 6 | Amino tris(methylenephosphonic acid) | 1.00-5.00% |
| 7 | Hydrophile pyrogene silica acid 200 | 0.10-2.00% |
| 8 | Benzotriazole | 1.0-5.00% |
| 9 | Magnesium sterate | 1.00-2.00% |
| 10 | Sodium metasilicate | 5.00-10.00% |
| 11 | Sodium hydroxide | 45-60% |
| 12 | Tensides | 5-25% |

Pre-Formulation Example 8

A highly alkaline tablet suitable for use in metal processing industry containing solvents and emulsifying agents. The tablet does not collapse into a cake when it is immersed in warm water of 35° C. or more. The Tablet is completely dissolved at 60° C. within <5 min, pH value of the solution is ca. 13 2. The tablet has a diameter of about 80 mm, and a height of about 25 mm. The weight of the tablet is about 125-130 grams.

The tablet contains:

| | | |
|---|---|---|
| 1 | Sodium tripolyphosphate | 10-20% |
| 2 | Sodium carbonate | 3.00-15% |
| 3 | n-hexylglycol | 10-20% |
| 4 | iso-C13 alcoholethoxylat (EO 3) | 3.00-6.00% |
| 5 | Iminosuccinate tetrasodium salt | 5.00-15.00% |
| 6 | Hydrophile pyrogene silica acid 200 | 0.10-2.00% |
| 7 | Magnesium sterate | 0.10-2.00% |

-continued

| 8 | polyethylene glycol 6000 | 1.00-5.00% |
| 9 | tolyltriazole | 5.00-10.00% |
| 10 | Sodium hydroxide | 50-70% |
| 11 | Tensides | 5-25% |

The invention is further illustrated in the following non-limiting examples.

Most of the tensides used in the examples are listed by HOCNF. Chemicals listed by HOCNF can be discarded directly into the sea. HOCNF (Harmonised Offshore Chemical Notification Format). The motors in question are ship motors with up to 100,000 HP—but it could also be motors for power plants or trucks.

Example 1

(All Percentages are in w/w)

| Sodium hydroxide | 52.00% w | |
| Sodium silicate | 9.50% | |
| Sodium glyconate | 15.00% | |
| Na-tripolyphosphate | 11.00% | |
| Na4-D,L-aspartic acid | 5.00% | |
| Silcium oxide | 0.20% | |
| Tensides | 5.00% | |
| Polyethylenglycol 6000 | 1.80% | (tablet excipient) |
| Mg-sterate | 0.50% | |

Tablet weight 70 g, diameter 50 mm, height 25 mm, dissolves in 80° C. water after ca. 60 sec.

Test for Corrosion:

After cleaning with the product, small steel plates are tested for corrosion after storage, Two test methods are employed:

Humid stable test during 10 days, no corrosion is seen.

In a humid chamber following DIN EN ISO 6270-2 no corrosion is seen after 30 days.

Use:

The product is used for cleaning of motors and parts thereof in a concentration of about 0.1 mol/L of NaOH or a tablet per 10 L of water, pH about 13. Advantageously, the product can be used for cleaning of eg diesel engines of ships, turbocharger and parts thereof. The motors and parts thereof must be of steel (iron). A 10 times higher efficiency is measured compared to existing products for similar use. The tablets according to the invention are placed in a basin or vessel eg with stirring and a temperature of 80° C. Motor/parts of the motor are placed in the basin/vessel and after about 10-20 min. (depending on the degree of accumulation of dirt), the parts are totally clean and free of residues of oil and soot. The measurements of the result are conducted by spraying a solvent on the motor parts, e.g. n-Hexane. The n-Hexane extract is examined by HPLC or GC-MS for dirt residues. Obviously, samples are taken from the same places before and after the cleaning procedure. Rust is also removed by the procedure. When using the product according to the invention, no environmentally toxic products are created, which are to be destroyed like other existing products on the marked. The product according to the invention does not corrode the motor parts, but cannot be used on aluminium. The corrosion is measured by taking a sample from the cleaning water and measuring the iron concentration by means of an AAS spectrophotometer. The product does not contain emulsifying substances, but dispersant(s). This is important for the use on ships and for oil rigs which only use product compositions in accordance with HOCNF (Harmonised Offshore Chemical Notification Format). When the product is rinsed off, it disperses.

If the motors are so big that they cannot be placed in a basin, a different recipe is used.

Example 2

High-Foaming Cleaning Tablets
(All Percentages are w/w)

| Na-hydroxide | 40.00% |
| Na-carbonate | 8.00% |
| Na-silicate | 25.00% |
| Amphoteric tensides | 5.00% |
| Na-Laurylsulphoacetate | 10.00% |
| Polyethylenglycol 6000 | 2.00% |
| Polysaccharide | 10.00% |

Tablet weight 70 g, diameter 50 mm, height 25 mm, dissolves in 10° C. water with 7.91 g/min.

When applied in a dispenser, 15 tablets can be used during one working day.

Results

Figure 2:
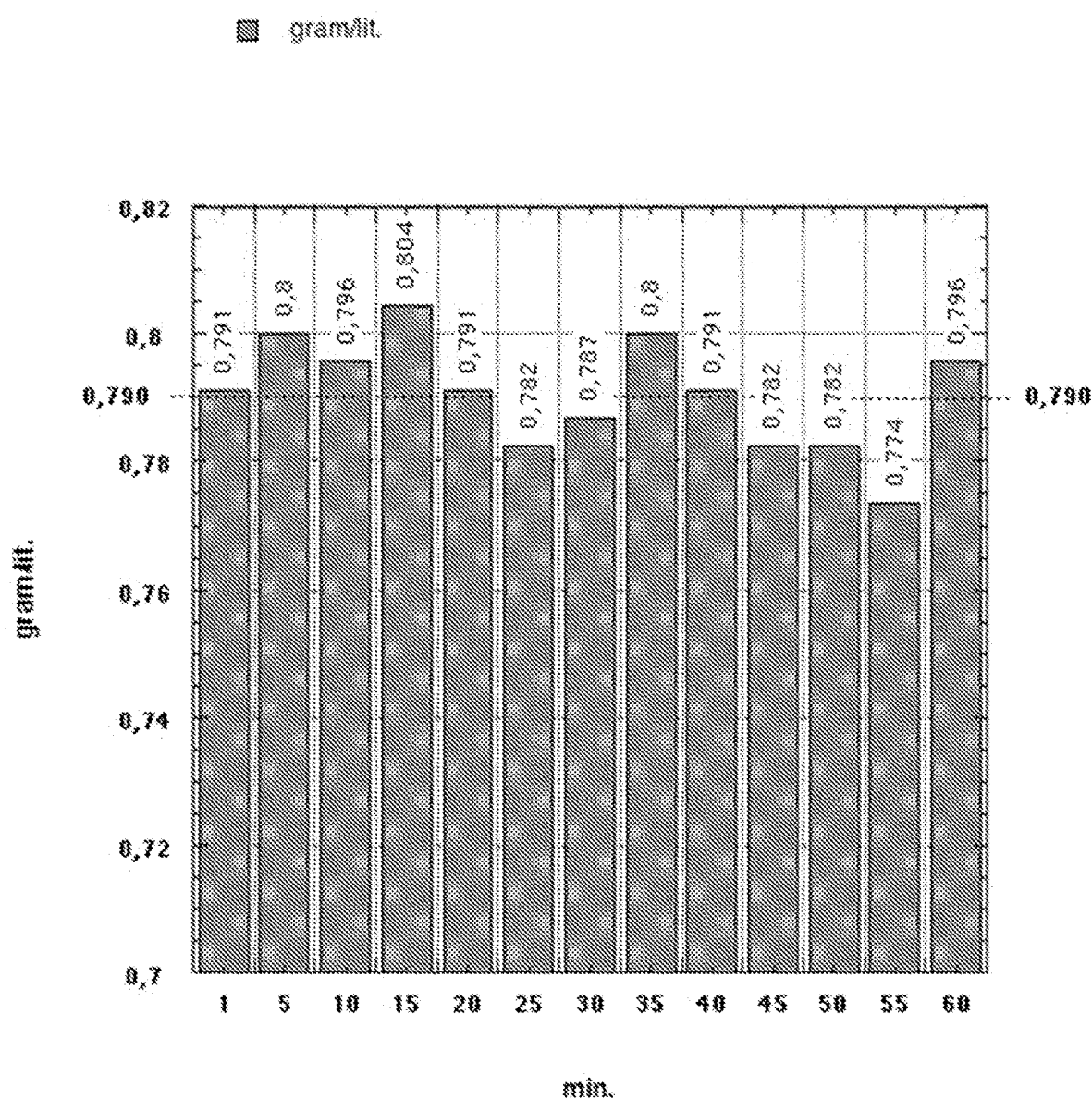
FIG. 2 shows the corresponding amount of conductivity variation n grams/L measured for the same period as in FIG. 1.

FIG. 1 shows conductivity measured during 60 min and FIG. 2 shows the results as gram/L.

The tablets according to the invention are placed in a dispenser as shown in PCT/EP2015/068165. The solution is sprayed onto the motor, said solution being able to adhere to the surfaces due to the foam, which is created, and the thickening agent, thus increasing the contact period in order to dissolve the oil-like dirt and soot more efficiently. After the period of action, the cleaning agent is rinsed off leaving a clean surface. The tablets have the characteristic that they are dissolved at a nearly constant rate which is measured by means of a conductivity meter. The product according to the invention is delivered through the dispenser with 10 l water per min. There is from 0.8 g/l-1.6 g/l per litre water having a conductivity of 9.1 mS/cm-18.2 mS/cm and a pH of 12.9 corresponding to a liquid market product with 30% TS and a dosage from 2.7%-5.4% which is a typical applicability. FIG. 1 shows variation in conductivity measured for 60 min. FIG. 2 shows the corresponding amount in gram measured for the same period. It is evident that the dosage is quite constant at 0.790±0.02 g/l.

This is important for the use on ships and for oil rigs which only use product compositions in accordance with HOCNF (Harmonised Offshore Chemical Notification Format). When the product is rinsed off, it disperses.

Example 3

Disinfectant Composition

The product may be used for disinfection of nets in aquacultures and of external surfaces of fishing crafts sailing between various fish farms. Due to safety, the ships are disinfected so that they do not carry any pathogenic microorganisms from one net to another.
(All Percentages are w/w)

| Sodium percarbonat | 39.15% | 39.15% |
| TAED | 43.78% | 43.78% |
| NaOH | 5.10% | — |
| Trisodium citrate | 6.95% | — |
| Citric acid, anhydrate | — | 1.05% |
| Laurylsulfoacetate | 3.68% | 3.68% |

| | | |
|---|---|---|
| Amphoteric tenside | 1.34% | 1.34% |
| pH - value | 12.4 | 11.1 |

70 gram tablet, diameter 50 mm, height 28 mm.

The disinfecting effect of the product is not pH-dependent, but temperature-dependent which is evident from the measuring results below. Presumably, the reason is that the bacteria growth increases with the temperature.

Use of the product according to the invention for aquaculture (fish farming facilities) will be sent for approval.

The product has the characteristic that it creates a very fine, stable, and adhering foam which increases the period of action and enhances the disinfecting effect.

| Pathogen Active Oxygene | Temperature | Period of action | Exposure | | Concentration |
|---|---|---|---|---|---|
| EN 1650 | | | | | |
| S. cerevisiae | 20 ± 1° C. | 15 min | 0.3% Albumin | 0.10% | 44 ppm |
| EN 1276 | | | | | |
| E. coli K12 | 20 ± 1° C. | 5 min | 0.3% Albumin | 0.10% | 44 ppm |
| P. aeruginosa | 20 ± 1° C. | 5 min | 0.3% Albumin | 0.10% | 44 ppm |
| E. hirae | 20 ± 1° C. | 5 min | 0.3% Albumin | 0.10% | 44 ppm |
| S. aureus | 20 ± 1° C. | 5 min | 0.3% Albumin | 0.10% | 44 ppm |
| EN 1276 | | | | | |
| S. enterica | 10 ± 1° C. | 5 min | 0.3% Albumin | 0.50% | 219 ppm |
| L. monocytogenes | 10 ± 1° C. | 5 min | 0.3% Albumin | 0.50% | 219 ppm |
| Y. enterocolitica | 10 ± 1° C. | 5 min | 0.3% Albumin | 0.50% | 219 ppm |
| E. coli O157:H7 | 10 ± 1° C. | 5 min | 0.3% Albumin | 0.50% | 219 ppm |
| EN 1650 | | | | | |
| C. albicans | 20 ± 1° C. | 15 min | 0.3% Albumin | 0.50% | 219 ppm |
| A. brasiliensis | 20 ± 1° C. | 15 min | 0.3% Albumin | 2.50% | 1093 ppm |
| C. albicans | 20 ± 1° C. | 15 min | 0.3% Albumin | 0.50% | 219 ppm |
| EN 1276 | | | | | |
| E. coil | 10 ± 1° C. | 5 min | 0.3% Albumin | 0.10% | 44 ppm |
| P. aeruginosa | 10 ± 1° C. | 5 min | 0.3% Albumin | 0.10% | 44 ppm |
| E. hirae | 10 ± 1° C. | 5 min | 0.3% Albumin | 0.10% | 44 ppm |
| S. aureus | 10 ± 1° C. | 5 min | 0.3% Albumin | 0.10% | 44 ppm |
| EN 13697 | | | | | |
| E. coli | 20 ± 1° C. | 5 min | 0.3% Albumin | 0.50% | 219 ppm |
| P. aeruginosa | 20 ± 1° C. | 5 min | 0.3% Albumin | 0.50% | 219 ppm |
| E. hirae | 20 ± 1° C. | 5 min | 0.3% Albumin | 0.50% | 219 ppm |
| S. aureus | 20 ± 1° C. | 5 min | 0.3% Albumin | 0.50% | 219 ppm |
| C. albicans | 20 ± 1° C. | 15 min | 0.3% Albumin | 0.50% | 219 ppm |
| A. brasiliensis | 20 ± 1° C. | 15 min | 0.3% Albumin | 2.00% | 874 ppm |
| EN 14476 | | | | | |
| IPN Virus | 4 ± 1° C. | 5 min | 0.3% Albumin | 0.50% | |
| | 15 ± 1° C. | 5 min | 0.3% Albumin | 0.50% | |
| Daphnia test | | | | | |
| EN 6341 | Daphnia magna Straus. | | $EC_{50}$ (24 h) | 46.9 mg/l produkt | |
| | | | $EC_{50}$ (48 h) | 31.3 mg/l produkt | |
| EN 14476 | Avian flue virus | | 1 min. | 0.50% | |

Convection ovens (special thermal air ovens working by thermal convection):

Example 4

(All Percentages are w/w)

| | |
|---|---|
| Na-hydroxide | 67.00% |
| Na-carbonate | 9.50% |
| Na-tripolyphosphatate | 11.00% |
| Na4-D,L-aspartic acid | 5.00% |
| Silicium oxide | 0.20% |
| Ionic tensides | 5.00% |
| Polyethylenglycol 6000 | 1.80% |
| Mg-sterate | 0.50% |

70 gram tablet, diameter 50 mm, height 28 mm.

A convection oven is sprayed with a fat mixture of chicken and pork fat (2:1). Approx. 100 g of the mixture is evenly spread on the side surfaces and the plates inside the oven. Two tablets of 70 g are used for cleaning the convection oven. The tablets are placed in a basket in the convection oven, and it is turned on at a cleaning program. After the cleaning, the convection oven is checked for fat residues. This is done by means of absorbent paper which is then extracted and esterified and examined in a GC (gas cromatograph).

The product may be used for cleaning aluminum motors. The product creates a stable foam which increases the period of action. When the product is rinsed off, it disperses so that an isolation of oil residues occurs. The remaining water may be led to the drain or the sea without any environmental problems.

Example 5

(All Percentages are w/w)

| | |
|---|---|
| Na-metasilicate | 50.00% |
| Na4-D,L-aspartic acid | 25.00% |
| Amphoteric tenside | 5.00% |
| Laurylsulfoacetate | 10.00% |
| Polyethylenglycol 6000 | 2.00% |
| Mg-sterate | 2.00% |
| Na-Oleoylsarcosinic acid | 5.00% |

The cleaning water is tested for aluminum-ions. The aluminum-ion concentration is measured at 10-5 mol/l.

The efficiency of the inhibitor is ascertained by Metrohm Autolab as linear polarization.

Electrochemical impedance spectroscopy, 69 gram tablet, diameter 50 mm, height 28 mm.

Example 6

(All Percentages are w/w)

| | |
|---|---|
| Na-carbonate | 5.00% |
| Na-polyphosphate | 13.50% |
| Na-ichlorisocyanurate | 30.00% |
| Mg-sterate | 1.50% |
| Na-hydroxide | 45.00% |
| Aminoxide (tenside) | 5.50% |

72 gram tablet, diameter 50 mm, height 26 mm.

Alkaline disinfectant foaming cleaning tablet with increased viscosity.

| Pathogen | Temperature | Period of Action | Exposure | Concentration (active chloro) |
|---|---|---|---|---|
| EN 1276 | | | | |
| S. enterica | 10 ± 1° C. | 5 min | 0.3% Albumin | 660 ppm |
| L. monocytogenes | 10 ± 1° C. | 5 min | 0.3% Albumin | 660 ppm |
| Y. enterocolitica | 10 ± 1° C. | 5 min | 0.3% Albumin | 660 ppm |
| E. coil O157:H7 | 10 ± 1° C. | 5 min | 0.3% Albumin | 660 ppm |
| S. cerivisiae | 20 ± 1° C. | 15 min | 0.3% Albumin | 200 ppm |
| EN 13697 | | | | |
| E. coli | 20 ± 1° C. | 15 min | 0.3% Albumin | 900 ppm |
| P. aeruginosa | 20 ± 1° C. | 15 min | 0.3% Albumin | 900 ppm |
| E. hirae | 20 ± 1° C. | 15 min | 0.3% Albumin | 900 ppm |
| S. aureus | 20 ± 1° C. | 15 min | 0.3% Albumin | 900 ppm |
| C. albicans | 20 ± 1° C. | 15 min | 0.3% Albumin | 200 ppm |
| EN 13697 | | | | |
| E. hirae | 20 ± 1° C. | 15 min | 0.3% Albumin | 900 ppm |
| EN 1276 | | | | |
| E. coli | 10 ± 1° C. | 5 min | 0.3% Albumin | 650 ppm |
| P. aeruginosa | 10 ± 1° C. | 5 min | 0.3% Albumin | 650 ppm |
| E. hirae | 10 ± 1° C. | 5 min | 0.3% Albumin | 650 ppm |
| S. aureus | 10 ± 1° C. | 5 min | 0.3% Albumin | 650 ppm |
| EN 1650 | | | | |
| C. albicans | 20 ± 1° C. | 15 min | 0.3% Albumin | 200 ppm |
| A. brasiliensis | 20 ± 1° C. | 15 min | 0.3% Albumin | 650 ppm |
| C. albicans | 20 ± 1° C. | 15 min | 0.3% Albumin | 200 ppm |
| EN 14476 | | | | |
| IPN Virus | 4 ± 1° C. | 5 min | 0.3% Albumin | 0.25% |
| | 15 ± 1° C. | 30 min | 0.3% Albumin | 0.32% |

Example 7

(All Percentages are w/w)

| | |
|---|---|
| Na-metasilicate | 25.00% |
| Na-hydroxide | 25.00% |
| Na-carbonate | 20.00% |
| C8-C10 alkylpolyglycoside | 5.00% |
| Laurylsulfocacetate | 10.00% |
| Polyethylenglycol 6000 | 2.00% |
| Mg-sterate | 2.00% |
| Na-Oleoylsarcosinic acid | 5.00% |
| n-Hexane | 6.00% |

125 gram tablet, diameter 80 mm, height 28 mm.

High-alkaline foaming tablet for cleaning steel, zinc-treated steel and aluminum.

In specific embodiments, the invention also relates to the following items

Items

1. A composition comprising:

| | |
|---|---|
| Alkalimetal hydroxide: | 45-90% |
| Silicate, such as e.g. $SiO_2$, $Na_2SiO_3$, $K_2SiO_3$ | 0.5-30 |
| Complex binder or dispersion agent: | 2.0-15 |
| Organic complexor: | 1.5-20 |
| Inhibitor: | 2.0-20 |
| Carbonates/hydrogen carbonates: | 2.0-15 |
| Tableting agents/excipients: | 0.5-3.0 |
| Nonionic tensides/surfactants (low & high EO): | 1.0-10 |
| Active chlorine agent: | 15-40 |
| Active oxygen agent: | 5-30 |
| Activator for active oxygen agent: | 7-45 |
| Anionic tensides/surfactants: | 2-15 |
| Organic solvents: | 3-15 |
| Enzymes: | 0.1-5.0 |
| Organic acids: | 5-30 |
| Fragrance component: | 0-3 |
| Thickener: | 0-20 | wherein the percentage of the ingredients is given as % w/w of the total weight of the composition.

2. A composition according to item 1, wherein the amount of alkali metal hydroxide is at least about 45% w/w, such as at least about 50% w/w, such as at least about 55% w/w, such as at least about 60% w/w, such as at least about 65% w/w, such as at least about 70% w/w, such as at least about 75% w/w, such as at least about 80% w/w, such as at least about 85% w/w, such as at least about 90% w/w, such as at least about 95% w/w based on the weight of the total weight of the composition.

3. A composition according to any of the preceding items, wherein the alkali metal hydroxides is e.g. LiOH, NaOH or KOH, or wherein the alkali components may be e.g. $Na_2CO_3$, $NaHCO_3$, $Na_2SiO_3$, $Na_5P_3O_{10}$, $K_4P_2O_7$ etc.

4. A composition according to any of the preceding items, wherein the complex binding agent and/or a dispersion agent is e.g. alkali salts of organic acids such as e.g. trisodium citrate anhydrate, tri-sodium citrate dehydrate, salts of polycarboxylates, salts of methylglycine diacetic acid, homo or co-polymers based on acrylic acid, glutamic acid-N,N-diaceticacid tetrasodium salt, N-(1,2-dicarboxyethyl)-tetrasodium salt, iminodisuccinate tetrasodium salt, mono-, di- and tricarboxylic acid sodium salts, phosphonates such e.g. as 1-Hydroxyethylidene-1,1-diphosphonic acid (HEDP), Amino tris(methylenephosphonic acid) (ATMP), Ethylenediamine tetra(methylene phosphonic acid) (EDTMP) and Phosphonobutane-tricarboxylic acid (PBTC) or chosen from carboxylated copolymers or homopolymers of acrylic acid.

5. A composition according to any of the preceding items, wherein the organic acid is e.g. anhydrous citric acid, anhydrous adipic acid, anhydrous malonic acid, anhydrous maleic acid etc.

6. A composition according to any of the preceding items, wherein the emulsifying agent is e.g. low ethoxylated fatty alcohols wherein the degree of ethoxylation (EO) is <7 such as less than 6 or less than 5 or less than 4 or less than 3.

7. A composition according to any of the preceding items, wherein the tensides/surfactants are non-ionic or anionic tensides/surfactants or a mixture thereof.

8. A composition according to any of the preceding items, wherein the non-ionic tensides are e.g. high etoxylated fatty alcohols having an EO>8 or an EO in range of about 8 to about 50, polyethylene glycol 400-8000, polyethylenepolypropyiene or alkylpoly glycosides etc.

9. A composition according to any of the preceding items, wherein the anionic tensides are sodium salts of alkyl sulphates, sodium salts of alkylether sulphates or betaines of any kind etc.

10. A composition according to any of the preceding items, wherein the organic solvent is capable of should dissolving fatty residues such as e.g. fats from food products or oils used or produced in the metal production industry, such as e.g. butyl diglycol, dihexylene glycol, dipropylene glycol monomethyl ether or paraffins such as n-paraffin and the likes.

11. A composition according to any of the preceding items, wherein the inhibitor is a corrosion inhibitor and selected from amino acids, various heterocyclic compounds such as e.g. tolyltriazole or bezontriazole or phosphonates.

12. A composition according to any of the preceding items, wherein the active chlorine or bleaching agent is e.g. anhydrous sodium dichlorocyanurate, anhydrous trichlorocyanurate, chloramine-T and calcium or sodium hypochlorite etc.

13. A composition according to any of the preceding items, wherein the active oxygen agent or compound is e.g. be sodium percarbonate, sodium perborate or potassium monopersulphate.

14. A composition according to any of the preceding items, wherein the activator for the active oxygen compounds is selected from e.g. tetraacetyl ethylenediamine, 1,5-diacetyl-2,2-dioxohexahydro-1,3,5-triazine or pentaacetylglucose.

15. A composition according to any of the preceding items, wherein the thickener is selected from e.g. a polysaccharides such as e.g. starches, vegetable gums, or pectin or a polyvinylalcohol or a polymeric compound such as e.g. acrylic polymers etc.

16. A composition according to any of the preceding items, wherein the enzyme is selected from e.g. an amylase or esparase.

17. A composition according to any of the preceding items, wherein the composition further comprises a fragrance component.

18. A composition according to any of the preceding items, wherein the composition is in form of a molded or compressed tablet or effervescent tablet, granules, pearls, micro tablets capsules, sachets etc.

19. A composition according to any of the preceding items, wherein the composition as a tablet comprising one or more compartments, layers or parts integrated into one dosage unit.

20. A composition according to any of the preceding items, wherein the tablet the one or more layers or parts comprise one or more of the components or agents of the composition according to the invention.

21. A composition according to any of the preceding items, wherein the tablet is coated with a dissolvable coating such as starch like coating that dissolves in water or the aqueous washing liquid.

22. A composition according to any of the preceding items, wherein the tablet has the shape of a circular tablet in dimension of from about 35 mm to about 65 mm and a weight of about 30 g to about 120 g.

23. Use of a composition according to any of the preceding items as a detergent or disinfectant.

24. Use of a composition according to item 23 as a detergent in the food or metal industry.

25. A method of preparing a composition according to any of item 1-22, the method comprising the steps of:
a) Under the proviso that the tensides and/or emulsifiers and/or inhibitors and/or organic solvent are in fluid form, these components are optionally mixed together prior to being sprayed onto the drying agent/absorption agents or sprayed onto the drying agent/absorption agents individually in any order or;
b) under the proviso that the tensides and/or emulsifiers and/or inhibitors and/or organic solvent are not in fluid form, these components are mixed together prior to being mixed with the drying agent/absorption agents
c) the resulting mix of tensides and/or emulsifiers and/or inhibitors and/or organic solvent and drying agent/absorption agents are allowed to rest for a period of from about 5 minutes to about 35 min, such as e.g. about 10 min, such as e.g. about 20 min or a period of up to about 1 day or about 2 days or about 3 days prior to any further processing of the material,
d) the resulting mix is then blended in a blending or mixing machine for a period of about 10 second or more, such as e.g. about 20 seconds or more, such as about 30 seconds or more, such as e.g. 60 seconds or more, such as e.g. 5 minutes or more,
e) the procedure of steps c) and d) is repeated several times with an interval of 30 minutes or more such as e.g. 60 minutes or more, such as e.g. 90 minutes or more until the desired flowability of the resulting mixed is obtained,
f) the remaining components/ingredients are added in any order to the mix resulting from step e);
g) The mix from step f) is optionally allowed to rest for a period of from about 5 minutes to about 35 min, such as e.g. about 10 min, such as e.g. about 20 min or a period of up to about 1 day or about 2 days or about 3 days prior to any further processing of the material 26. A process according to item 25, wherein the drying agents/absorption agent in a mix of two or more drying agents/absorption agents, such as e.g. three or more drying agents/absorption agents, such as e.g. four or more drying agents/absorption agents such as e.g. five or more drying agents/absorption agents, such as e.g. sodium carbonate or a mixture of sodium carbonate and sodium-/potassium phosphates.

27. A process according to items 25-26, wherein the agents/absorption agents are in powder from or granule form or ultrafine powder form.

28. A process according to items 25-27, wherein the ratio between solvents and/or emulsifiers to drying agent/absorption agents is e.g. about 1:2 or about 1:1.

29. A highly alkalic tablet suitable for use in the food industry, the tablet comprising

| 1 | Sodium tripolyphosphate | 5.00-20.00% |
|---|---|---|
| 2 | Amino tris(methylenephosphonic) acid | 1.00-10.00% |
| 3 | Hydrophile pyrogene silica acid 200 | 0.10-5.00% |
| 4 | Sodium carbonate | 2.00-10.0% |
| 5 | Magnesium sterate | 0.50-2.00% |
| 6 | methylglycine diacetic acid | 5.00-15.00% |
| 7 | polyethylene glycol 6000 | 1.00-5.00% |
| 8 | tolyltriazole | 1.00-5.00% |
| 9 | Sodium hydroxide | 60.00-90.00% |

30. A highly alkalic tablet suitable for use in the food industry or gastronomic industry such as e.g. restaurant, the tablet comprising:

| 1 | Sodium tripolyphosphate | 10.00-25.00% |
|---|---|---|
| 2 | Sodium carbonat | 5.00-15.00% |
| 3 | Sodium dichlorisocyanurat | 20.00-35.00% |
| 4 | Amino tris(methylenephosphonic) acid | 1.00-5.00% |
| 5 | Hydrophile pyrogene silica acid 200 | 0.10-2.00% |
| 6 | Benzotriazole | 1.0-5.00% |
| 7 | Magnesium sterate | 1.00-2.00% |
| 8 | Sodium hydroxide | 45.00-60.00% | and wherein the composition fulfils the requirements of a disinfectant according to standards DIN/EN 1276. DIN/EN 1650 and DIN/EN 13697.

31. A highly alkalic tablet suitable for use in the food industry or gastronomic industry such as e.g restaurant as a disinfectant, the tablet comprising:

| 1 | Sodium tripolyphosphate | 10.00-25.00% |
|---|---|---|
| 2 | Sodium carbonat | 5.00-15.00% |
| 3 | Amino tris(methylenephosphonic) acid | 2.00-10.00% |
| 4 | Sodium percarbonate | 10.00-25.00% |
| 5 | tetraacetyl ethylenediamine | 10.00-25.00% |
| 6 | Hydrophile pyrogene silica acid 200 | 0.10-2.00% |
| 7 | Benzotriazole | 1.00-5.00% |
| 8 | Magnesium sterate | 1.00-2.00% |
| 9 | Sodium hydroxide | 45.00-60.00% | and wherein the composition fulfils the requirements of a disinfectant according to standards DIN/EN 1276, DIN/EN 1650 and DIN/EN 13697.

32. A highly alkalic tablet suitable for use in the food industry wherein the composition highly foaming capacity and is effervescent, the tablet comprising:

| 1 | Citric acid, anhydrous | 15.00-30.00% |
|---|---|---|
| 2 | Sodium carbonate | 25.00-40.00% |
| 3 | Magnesium sterate | 0.50-2.00% |
| 4 | D,L-aspartic acid, N-(1,2-dicarboxyethyl)-tetrasodium salt | 1.00-10.00% |
| 5 | Cocobetaine | 2.00-10.00% |
| 6 | Cholic acid | 1.00-10.00% |
| 7 | Sodium Lauryl Sulfoacetate | 2.00-10.00% |
| 8 | Sodium hydroxide | 45.00-65.00% |

33. A highly alkalic tablet suitable for use in the metal processing industry, where the corn-position is highly viscous to allow a prolonged contact period, the tablet comprising:

| 1 | Sodium tripolyphosphate | 10.00-20.00% |
|---|---|---|
| 2 | Xanthan Gum | 10.00-20.00% |
| 3 | Iminodisuccinate tetrasodium salt | 5.00-15.00% |
| 4 | Hydrophile pyrogene silica acid 200 | 0.10-2.00% |
| 5 | Sodium carbonate | 3.00-15.00% |
| 6 | Magnesium sterate | 0.10-2.00% |
| 7 | polyethylene glycol 6000 | 1.00-5.00% |
| 8 | tolyltriazole | 5.00-10.00% |
| 9 | Sodium hydroxide | 50.00-70.00% |

34. A highly alkalic tablet suitable for use in the metal processing industry, where the composition has an enhanced corrosion inhibiting effect, the tablet comprising:

| 1 | Sodium tripolyphosphate | 10.00-25.00% |
|---|---|---|
| 2 | Amino tris(methylenephosphonic) acid | 2.00-10.00% |
| 3 | Phosphor acid polyester | 10.00-20.00% |
| 4 | Hydrophile pyrogene silica acid 200 | 0.10-5.00% |
| 5 | Sodium carbonate | 3.00-10.00% |
| 6 | Magnesium sterate | 0.10-2.00% |
| 7 | Iminodisuccinate tetrasodium salt | 5.00-10.00% |
| 8 | polyethylene glycol 6000 | 1.00-5.00% |
| 9 | tolyltriazole | 6.00-10.00% |
| 10 | Sodium hydroxide | 50.00-70.00% |

35. A highly alkalic tablet suitable for use in dish washing machines, the tablet comprising:

| 1 | Sodium tripolyphosphate | 10.00-25.00% |
|---|---|---|
| 2 | Sodium carbonate | 5.00-15.00% |
| 3 | Amylase | 0.10-1.00% |
| 4 | Esparase | 0.10-2.00% |
| 5 | Sodium dichlorisocyanurate | 20.00-35.00% |
| 6 | Amino tris(methylenephosphonic acid) | 1.00-5.00% |
| 7 | Hydrophile pyrogene silica acid 200 | 0.10-2.00% |
| 8 | Benzotriazole | 1.0-5.00% |
| 9 | Magnesium sterate | 1.00-2.00% |
| 10 | Sodium metasilicate | 5.00-10.00% |
| 11 | Sodium hydroxide | 45.00-60.00% |

36. A highly alkalic tablet suitable for use in metal processing industry containing solvents and emulsifying agents, the tablet comprising:

| 1 | Sodium tripolyphosphate | 10.00-20.00% |
|---|---|---|
| 2 | Sodium carbonate | 3.00-15.00% |
| 3 | n-hexylglycol | 10.00-20.00% |
| 4 | iso-C13 alcoholethoxylat (EO 3) | 3.00-6.00% |
| 5 | Iminodisuccinate tetrasodium salt | 5.00-15.00% |
| 6 | Hydrophile pyrogene silica acid 200 | 0.10-2.00% |
| 7 | Magnesium sterate | 0.10-2.00% |
| 8 | polyethylene glycol 6000 | 1.00-5.00% |
| 9 | tolyltriazole | 5.00-10.00% |
| 10 | Sodium hydroxide | 50.00-70.00% |

The invention claimed is:

1. A composition comprising:
45-83% w/w$_t$ of alkaline constituents,
5-25% w/w$_t$ of tensides, and
an disinfectant compound selected from
   i) sodium dichloroisocyanurate or another chlorine agent, and/or
   ii) a combination of an active oxygen agent with an activator for the active oxygen agent, and
wherein the concentration of the disinfectant compound in the composition is
   i) from 15-40% w/w$_t$ when a chlorine agent is included, and
   ii) from 5-30% w/w$_t$ of an active oxygen agent and from 7-45% w/w$_t$ of an activator for the active oxygen when a combination is included, and
wherein the tensides comprise aminoxide in the form H$_3$N$^+$—O$^-$,
optionally complex binderdispersion agents, tableting excipients, organic acids, emulsifying agents, andor thickeners,
with the proviso that the sum of ingredients amounts to 100% w/w$_t$, and
wherein the alkaline constituents are selected from
   alkali metal hydroxide 40-83% w/w$_t$
   silicate 0.5-30% w/w$_t$
   carbonateshydrogen carbonates 2-15% w/w$_t$
   and mixtures thereof, and
wherein w$_t$=total composition weight, and the composition generates foam when used.

2. A composition according to claim 1, wherein the alkali metal hydroxide comprises sodium, potassium, or lithium.

3. A composition according to claim 2, wherein the alkali metal hydroxide is present in a concentration of from 40 to 60% w/w$_t$.

4. A composition according to claim 2, wherein the alkali metal hydroxide is present in a concentration of from 40 to 55% w/w$_t$.

5. A composition according to claim 1, wherein the alkali metal hydroxide is present in a concentration of from 40 to 60% w/w$_{al}$.

6. A composition according to claim 1, further comprising at least one of:
   Complex binder or dispersion agent: 0-15% w/w$_t$;
   Organic complexator: 0-20% w/w$_t$;
   Corrosion Inhibitor: 0-20% w/w$_t$;
   Tableting agentsexcipients: 0-3% w/w$_t$;
   Organic solvents: 0-15% w/w$_t$;
   Enzymes: 0-5% w/w$_t$;
   Organic acids: 0-30% w/w$_t$;
   Fragrance component: 0-3% w/w$_t$; and
   Thickener: 0-20% w/w$_t$.

7. A composition according to any of the preceding claims, wherein the alkali metal hydroxides is LiOH, NaOH or KOH, or wherein the alkali constituents are Na$_2$CO$_3$, NaHCO$_3$, or Na$_2$SiO$_3$.

8. A composition according to claim 1, wherein a complex binder or dispersion agent is present and is selected from alkali salts of organic acids, salts of polycarboxylates, salts of methylglycine diacetic acid, homo or co-polymers based on acrylic acid, glutamic acid-N,N-diaceticacid tetrasodium salt, iminodisuccinate tetrasodium salt, mono-, di- and tri-carboxylic acid sodium salts, Na-salts of oligophosphoric acid, phosphonates or carboxylated copolymers or homopolymers of acrylic acid.

9. A composition according to claim 1, wherein an organic acid is present and is selected from anhydrous citric acid, anhydrous adipic acid, anhydrous malonic acid, and anhydrous maleic acid.

10. A composition according to claim 1, wherein an emulsifying agent is present and is a low ethoxylated fatty alcohol wherein the degree of ethoxylation (EO) is less than 7.

11. A composition according to claim 1, further comprising a corrosion inhibitor selected from amino acids, heterocyclic compounds, or phosphonates.

12. A composition according to claim 1, wherein the chlorine agent or active oxygen agent is anhydrous sodium dichlorocyanurate, anhydrous trichlorocyanurate, chloramine-T, calcium hypochlorite, or sodium hypochlorite.

13. A composition according to claim 1, wherein the activator for the active oxygen agent is selected from tetraacetyl ethylenediamine, 1,5-diacetyl-2,2-dioxohexahydro-1,3,5-triazine, or pentaacetylglucose.

14. A composition according to claim 1, wherein a thickener is present and is selected from polysaccharides, polyvinylalcohol, or a polymeric compound.

15. A composition according to claim 1, wherein the alkali metal hydroxide is present in a concentration of from 40 to 55% w/w$_t$.

16. A method of cleaning and disinfecting a surface, the method comprising applying the composition of claim 1 to the surface.

17. A method of cleaning an appliance in the food or metal industry, the method comprising applying the composition of claim 1 to the appliance.

* * * * *